US008566117B1

(12) United States Patent
Troutt et al.

(10) Patent No.: US 8,566,117 B1
(45) Date of Patent: Oct. 22, 2013

(54) SYSTEMS AND METHODS FOR FACILITATING HEALTHCARE PROVIDER ENROLLMENT WITH ONE OR MORE PAYERS

(75) Inventors: Paul Troutt, Cumming, GA (US); Nikhil Sarathi, Cumming, GA (US); Marty Smith, Alpharetta, GA (US)

(73) Assignee: McKesson Financial Holdings, Hamilton (BM)

( * ) Notice: Subject to any disclaimer, the term of this patent is extended or adjusted under 35 U.S.C. 154(b) by 159 days.

(21) Appl. No.: 13/173,985

(22) Filed: Jun. 30, 2011

(51) Int. Cl.
*G06Q 50/00* (2012.01)

(52) U.S. Cl.
USPC .......................................................... 705/2

(58) Field of Classification Search
USPC .......................................................... 705/2
See application file for complete search history.

(56) References Cited

U.S. PATENT DOCUMENTS

| | | |
|---|---|---|
| 4,674,041 A | 6/1987 | Lemon et al. |
| 4,723,212 A | 2/1988 | Mindrum et al. |
| 4,910,672 A | 3/1990 | Off et al. |
| 5,007,641 A | 4/1991 | Seidman |
| 5,080,364 A | 1/1992 | Seidman |
| 5,173,851 A | 12/1992 | Off et al. |
| 5,201,010 A | 4/1993 | Deaton et al. |
| 5,237,620 A | 8/1993 | Deaton et al. |
| 5,305,196 A | 4/1994 | Deaton et al. |
| 5,327,508 A | 7/1994 | Deaton et al. |
| 5,388,165 A | 2/1995 | Deaton et al. |
| 5,430,644 A | 7/1995 | Deaton et al. |
| 5,448,471 A | 9/1995 | Deaton et al. |
| 5,588,649 A | 12/1996 | Blumberg et al. |
| 5,592,560 A | 1/1997 | Deaton et al. |
| 5,612,868 A | 3/1997 | Off et al. |
| 5,621,812 A | 4/1997 | Deaton et al. |
| 5,628,530 A | 5/1997 | Thornton |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,469 A | 8/1997 | Deaton et al. |

(Continued)

FOREIGN PATENT DOCUMENTS

| | | |
|---|---|---|
| CA | 2482370 A1 | 3/2006 |
| WO | WO 9503569 A3 | 2/1995 |
| WO | WO 0039737 A1 | 7/2000 |
| WO | WO 2007025295 A2 | 3/2007 |

OTHER PUBLICATIONS

Sampson, R.J., Taking Control of Health Care Costs, Best's Review—Life Health Insurance Edition, Nov. 1983, pp. 64-66, vol. 84, Issue 7, USA.

(Continued)

*Primary Examiner* — John Pauls
(74) *Attorney, Agent, or Firm* — Sutherland Asbill & Brennan LLP (57) ABSTRACT

Systems and methods may facilitate healthcare provider enrollment with one or more payers. The systems and methods may include receiving identification of a plurality of payers; determining required enrollment information needed for the healthcare provider to enroll for one or more services of the plurality of payers; retrieving or receiving available enrollment information associated with the healthcare provider; determining missing enrollment information based upon a comparison of the required enrollment information and the available enrollment information; and delivering, by the service provider to the healthcare provider computer, a request for the missing enrollment information.

18 Claims, 7 Drawing Sheets

(56) References Cited

U.S. PATENT DOCUMENTS

| | | |
|---|---|---|
| 5,675,662 A | 10/1997 | Deaton et al. |
| 5,687,322 A | 11/1997 | Deaton et al. |
| 5,832,457 A | 11/1998 | O'Brien et al. |
| 5,845,255 A | 12/1998 | Mayaud |
| 5,857,175 A | 1/1999 | Day et al. |
| 5,892,827 A | 4/1999 | Beach et al. |
| 5,915,007 A | 6/1999 | Klapka |
| 5,926,795 A | 7/1999 | Williams |
| 5,970,469 A | 10/1999 | Scroggie et al. |
| 5,974,399 A | 10/1999 | Giuliani et al. |
| 6,012,035 A | 1/2000 | Freeman, Jr. et al. |
| 6,014,634 A | 1/2000 | Scroggie et al. |
| 6,021,392 A | 2/2000 | Lester et al. |
| 6,026,370 A | 2/2000 | Jermyn |
| 6,041,309 A | 3/2000 | Laor |
| 6,055,573 A | 4/2000 | Gardenswartz et al. |
| 6,067,069 A | 5/2000 | Krause |
| 6,067,524 A | 5/2000 | Byerly et al. |
| 6,185,541 B1 | 2/2001 | Scroggie et al. |
| 6,195,612 B1 | 2/2001 | Pack-Harris |
| 6,202,923 B1 | 3/2001 | Boyer et al. |
| 6,205,455 B1 | 3/2001 | Umen |
| 6,240,394 B1 | 5/2001 | Uecker |
| 6,260,758 B1 | 7/2001 | Blumberg |
| 6,278,979 B1 | 8/2001 | Williams |
| 6,282,516 B1 | 8/2001 | Giuliani |
| 6,298,330 B1 | 10/2001 | Gardenswartz et al. |
| 6,304,849 B1 | 10/2001 | Uecker et al. |
| 6,307,958 B1 | 10/2001 | Deaton et al. |
| 6,321,210 B1 | 11/2001 | O'Brien et al. |
| 6,334,108 B1 | 12/2001 | Deaton et al. |
| 6,377,935 B1 | 4/2002 | Deaton et al. |
| 6,424,949 B1 | 7/2002 | Deaton et al. |
| 6,484,146 B2 | 11/2002 | Day et al. |
| 6,584,448 B1 | 6/2003 | Laor |
| 6,684,195 B1 | 1/2004 | Deaton et al. |
| 6,757,898 B1 | 6/2004 | Ilsen et al. |
| 6,769,228 B1 | 8/2004 | Mahar |
| 6,795,809 B2 | 9/2004 | O'Brien et al. |
| 6,885,994 B1 | 4/2005 | Scroggie et al. |
| 7,024,374 B1 | 4/2006 | Day et al. |
| 7,058,584 B2 | 6/2006 | Kosinski et al. |
| 7,058,591 B2 | 6/2006 | Giuliani et al. |
| 7,155,397 B2 | 12/2006 | Alexander et al. |
| 7,225,052 B2 | 5/2007 | Foote et al. |
| 7,228,285 B2 | 6/2007 | Hull et al. |
| 7,233,913 B2 | 6/2007 | Scroggie et al. |
| 7,309,001 B2 | 12/2007 | Banfield et al. |
| 7,415,426 B2 | 8/2008 | Williams et al. |
| 7,426,480 B2 | 9/2008 | Granger et al. |
| 2002/0002495 A1 | 1/2002 | Ullman |
| 2002/0087583 A1 | 7/2002 | Morgan et al. |
| 2002/0111832 A1 | 8/2002 | Judge |
| 2002/0198831 A1 | 12/2002 | Patricelli et al. |
| 2003/0009367 A1 | 1/2003 | Morrison |
| 2003/0050799 A1 | 3/2003 | Jay et al. |
| 2003/0074218 A1 | 4/2003 | Liff et al. |
| 2003/0125986 A1 | 7/2003 | Collosi |
| 2003/0149625 A1 | 8/2003 | Leonardi et al. |
| 2003/0154163 A1 | 8/2003 | Phillips et al. |
| 2003/0229540 A1 | 12/2003 | Algiene |
| 2004/0039599 A1 | 2/2004 | Fralic |
| 2004/0054657 A1 | 3/2004 | Takeyama |
| 2004/0073457 A1 | 4/2004 | Kalies |
| 2004/0078234 A1 | 4/2004 | Tallal, Jr. et al. |
| 2004/0107117 A1 | 6/2004 | Denny |
| 2004/0111277 A1 | 6/2004 | Pearson et al. |
| 2004/0117323 A1 | 6/2004 | Mindala |
| 2004/0148198 A1 | 7/2004 | Kalies |
| 2004/0153336 A1 | 8/2004 | Virdee et al. |
| 2004/0249745 A1 | 12/2004 | Baaren |
| 2005/0015280 A1 | 1/2005 | Gabel et al. |
| 2005/0033610 A1 | 2/2005 | Cunningham |
| 2005/0060201 A1 | 3/2005 | Connely, III et al. |
| 2005/0086081 A1 | 4/2005 | Brock-Fisher |
| 2005/0090425 A1 | 4/2005 | Reardan et al. |
| 2005/0102169 A1 | 5/2005 | Wilson |
| 2005/0154627 A1 | 7/2005 | Zuzek et al. |
| 2005/0171815 A1 | 8/2005 | Vanderveen |
| 2005/0187793 A1 | 8/2005 | Myles |
| 2005/0197862 A1 | 9/2005 | Paterson et al. |
| 2005/0240473 A1 | 10/2005 | Ayers, Jr. et al. |
| 2005/0288972 A1 | 12/2005 | Marvin et al. |
| 2006/0015518 A1 | 1/2006 | Eletreby et al. |
| 2006/0020514 A1 | 1/2006 | Yered |
| 2006/0026041 A1 | 2/2006 | Ullman |
| 2006/0149587 A1 | 7/2006 | Hill, Sr. et al. |
| 2006/0149784 A1 | 7/2006 | Tholl et al. |
| 2006/0184391 A1 | 8/2006 | Barre et al. |
| 2006/0224415 A1 | 10/2006 | Hudson et al. |
| 2006/0229915 A1 | 10/2006 | Kosinski et al. |
| 2006/0259363 A1 | 11/2006 | Jhetam |
| 2006/0271398 A1 | 11/2006 | Belcastro |
| 2006/0287886 A1 | 12/2006 | Kitazawa |
| 2007/0005402 A1 | 1/2007 | Kennedy et al. |
| 2007/0050209 A1 | 3/2007 | Yered |
| 2007/0088576 A1 | 4/2007 | de Beus et al. |
| 2007/0124177 A1 | 5/2007 | Engleson et al. |
| 2007/0136100 A1 | 6/2007 | Daugherty et al. |
| 2007/0179957 A1 | 8/2007 | Gibson et al. |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2010/0228564 A1* | 9/2010 | Tavakol et al. .................. 705/2 |

OTHER PUBLICATIONS

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic; On-line Goes In-House, Chain Store Age Executive, Jan. 1987, pp. 128-32. vol. 63, Issue 1, USA.

Anonymous, TechRx Announces Successful Beta Deployment of T-Rex. PR Newswire. May 13, 2002.

* cited by examiner

Select Services

Healthcare Provider wishes to register to:

☐ Submit Claims
☐ Receive Electronic Remittance
☐ Receive Reports

[EXIT] [NEXT]

FIG. 4

Initial Enrollment Information

Provider Name: [          ]
Address: [          ]
City: [     ]  State: [GA]  Zip: [     ]
Phone Number: [     ]
Email Address: [          ]
Provider Identifier: [     ]

[EXIT] [NEXT]

FIG. 5

Select Payer(s) to Enroll With

| Payer Name |
|---|
| Payer #1 |
| Payer #2 |
| Payer #3 |
| Payer #4 |
| Payer #5 |
| . |
| . |
| Payer #n |

EXIT  NEXT

FIG. 6

Additional Enrollment Information Needed

Railroad Medicare Provider Number: [        ]

Electronic enrollment is available for:
   [Identify Payers]
   [ ] Please check box if you wish to utilize electronic enrollment Additional Enrollment Information #1: [        ]
Additional Enrollment Information #2: [        ]
.
.
.
Additional Enrollment Information #n: [        ]

[ EXIT ]   [ NEXT ]

FIG. 7

This form must be completed and signed by the Provider ONLY.

Action Requested: ☒ Electronic Claims Submissions    ☒ Electronic Remittance
                  ☒ Electronic Response Reports Provider for whom Submitter will be granted access:

Provider Name: ______________________________

Provider E-mail Address: ______________________________

Railroad Medicare
Provider Number: ______________________    NPI: ______________________

Name: ______________________________

Title: ______________________________

Address: ______________________________

City: ______________________    State: __________    Zip: __________

Phone: ______________________________

Submitter Name: ______________________________

I hereby authorize the above submitter to receive the items notated above on my behalf.

Signature: ______________________________    Date: __________

FIG. 8

SYSTEMS AND METHODS FOR FACILITATING HEALTHCARE PROVIDER ENROLLMENT WITH ONE OR MORE PAYERS

FIELD OF THE INVENTION

Aspects of the invention relate generally to facilitating or automating enrollment, and more particularly to systems and methods for facilitating healthcare provider enrollment with one or more payers.

BACKGROUND OF THE INVENTION

Healthcare providers are required to enroll with a payer in order for the payer to process claims of the healthcare process. However, this enrollment process is manual, time-consuming, and tedious. Likewise, the enrollment must be performed on a payer-by-payer basis. Thus, there is an opportunity for systems and methods for facilitating healthcare provider enrollment with one or more payers.

SUMMARY OF THE INVENTION

Some or all of the above needs and/or problems may be addressed by certain embodiments of the invention. Embodiments of the invention may include systems and methods for facilitating healthcare provider enrollment with one or more payers.

In one embodiment, there is a method. The method may include: receiving, by a service provider comprising at least one computer from a healthcare provider computer associated with a healthcare provider, identification of a plurality of payers; determining, by the service provider, required enrollment information needed for the healthcare provider to enroll for one or more services of the plurality of payers; retrieving or receiving, by the service provider, available enrollment information associated with the healthcare provider; determining, by the service provider, missing enrollment information based upon a comparison of the required enrollment information and the available enrollment information; and delivering, by the service provider to the healthcare provider computer, a request for the missing enrollment information.

In accordance with another embodiment of the invention, there is a system. The system may include at least one memory operable to store computer-executable instructions, and at least one processor configured to access the at least one memory. The at least one processor may be further configured to execute the computer-executable instructions to: receive, from a healthcare provider computer associated with a healthcare provider, identification of a plurality of payers; determine required enrollment information needed for the healthcare provider to enroll for one or more services of the plurality of payers; retrieve or receive available enrollment information associated with the healthcare provider; determine missing enrollment information based upon a comparison of the required enrollment information and the available enrollment information; and deliver, to the healthcare provider computer, a request for the missing enrollment information.

BRIEF DESCRIPTION OF THE DRAWINGS

Reference will now be made to the accompanying drawings, which are not necessarily drawn to scale, and wherein.

DETAILED DESCRIPTION

Example embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Embodiments of the invention are directed towards facilitating healthcare provider enrollment with one or more payers. According to an example embodiment of the invention, a service provider can identify the required enrollment information needed for a healthcare provider to enroll for one or more services of one or more payers. Thus, a service provider can assist a healthcare provider, perhaps via an Internet portal/website, in completing enrollment forms for one or more payers or otherwise enrolling the healthcare provider for one or more services of one or more payers. The enrollment may be needed before a healthcare provider, or a service provider acting on behalf of the healthcare provider, is able to submit healthcare transactions for processing by a payer, or otherwise receive transaction responses or reports from the payer.

System Overview

Figure 1:
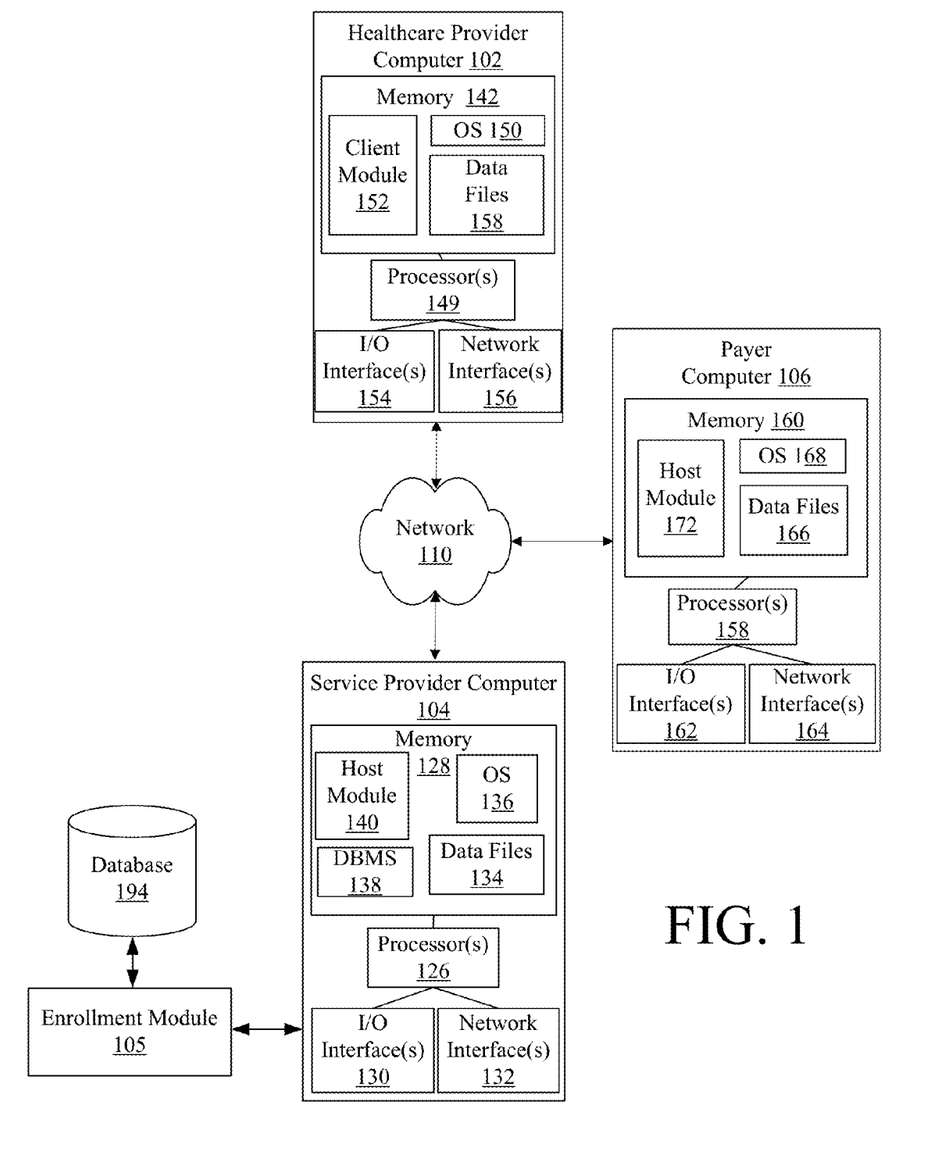
FIG. 1 illustrates a block diagram of an example healthcare system for facilitating healthcare provider enrollment with one or more payers, according to an example embodiment of the invention.

FIG. 1 illustrates an example healthcare system 100 for facilitating healthcare provider enrollment with one or more payers, according to an example embodiment of the invention. As shown in FIG. 1, the system 100 may include one or more healthcare provider computers 102, service provider computers 104, and payer computers 106, which are each configured for accessing and reading associated computer-readable media having stored thereon data and/or computer-executable instructions for implementing the various methods described herein. Generally, network devices and systems, including the one or more healthcare provider computers 102, service provider computers 104, and payer computers 106 have hardware and/or software for transmitting and receiving data and/or computer-executable instructions over a communications link and at least one memory for storing data and/or computer-executable instructions. These network devices and systems may also include a processor for processing data and executing computer-executable instructions, as well as other internal and peripheral components that are well-known in the art. As used herein, the term "computer-readable medium" may describe any form of computer memory or memory device.

As shown in FIG. 1, the healthcare provider computer 102, service provider computer 104, and payer computer 106 may be in communication with each other via network 110, which as described below can include one or more separate or shared private and/or public networks, including the Internet. Each of these components—the healthcare provider computer 102, the service provider computer 104, the payer computer 106, and the network 110—will now be discussed in further detail.

First, one or more healthcare provider computers 102 may be associated with a healthcare provider or a group of healthcare providers, including those associated with a physician, hospital/clinic, pharmacy, pharmacist, and the like. An example healthcare provider computer 102 may be any processor-driven device, such as a server computer, a mainframe computer, one or more networked computers, a desktop computer, a personal computer, a laptop computer, a mobile computer, a handheld portable computer, a digital assistant, a personal digital assistant, a digital tablet, an Internet appliance, or any other processor-based device. In addition to having processor(s) 149, the healthcare provider computer 102 may further include a memory 142, input/output ("I/O") interface(s) 154, and network interface(s) 156. The memory 142 may store data files 158 and various program modules, such as an operating system ("OS") 150 and a client module 152. The memory 142 may be any computer-readable medium, coupled to the processor(s) 149, such as RAM, ROM, and/or a removable storage device for storing data files 158 and a database management system ("DBMS") to facilitate management of data files 158 and other data stored in the memory 142 and/or stored in separate databases. The OS 150 may be, but is not limited to, Microsoft Windows®, Apple OSX™, Linux, Unix, or a mainframe operating system. The client module 152 may be an Internet browser or other software, including a dedicated program, for interacting with the service provider computer 104 and/or the payer computer 106. For example, a healthcare provider or other user may utilize the client module 152 to obtain assistance from the service provider computer 104 in enrolling in one or more services of one or more payers, as described herein. The client module 152 can also be used to prepare and provide a healthcare transaction request such as prescription claims or medical claims to the service provider computer 104 for delivery to the payer computer 106 for adjudication and/or benefits processing. The healthcare provider computer 102 may also utilize the client module 152 to retrieve or otherwise receive healthcare transaction responses, remittance advices, data, and/or reports from the service provider computer 104 and/or payer computer 106.

Second, one or more service provider computers 104 may be associated with an example service provider. The example service provider can facilitate healthcare provider enrollment with one or more payers, as described herein. The example service provider can also facilitate the routing or delivery of healthcare transactions between one or more healthcare provider computers 102 and payer computers 106.

An example service provider computer 104 may include, but is not limited to, any processor-driven device that is configured for receiving, processing, and fulfilling requests from the healthcare provider computer 102 and/or payer computer 106 relating to enrollment or healthcare transactions or other activities. The service provider computer 104 may include, but is not limited to, a server computer, a mainframe computer, one or more networked computers, or any other processor-based device. According to an example embodiment of the invention, the service provider computer 104 may comprise one or more web servers for providing one or more Internet portals or websites for facilitating healthcare provider enrollment with one or more payers. The service provider computer 104 can also include, but is not limited to, one or more "switches" or "switch providers" performing routing and processing (e.g., pre- and post-routing editing) of prescription claim transactions between or among pharmacies, payers/claims processors, and/or other service providers. In an example embodiment of the invention, the service provider computer 104 may include multiple computers or computer systems for performing respective tasks.

The service provider computer 104 may include processor(s) 126, a memory 128, input/output ("I/O") interface(s) 130, and network interface(s) 132. The memory 128 may be any computer-readable medium, coupled to the processor(s) 126, such as RAM, ROM, and/or a removable storage device for storing data files 134 and a database management system ("DBMS") 138 to facilitate management of data files 134 and other data stored in the memory 128 and/or stored in one or more databases 194. The memory 128 may store data files 134 and various program modules, such as an operating system ("OS") 136, a database management system ("DBMS") 138, and the host module 140. The OS 136 may be, but is not limited to, Microsoft Windows®, Apple OSX™, Linux, Unix, or a mainframe operating system. The data files 134 may also store routing tables for determining the destination of communications received from the healthcare provider computer 102 or the payer computer 106. The host module 140 may receive, process, and respond to requests from the client module 152 of the healthcare provider computer 102, and may further receive, process, and respond to requests from the host module 172 of the payer computer 106.

An enrollment module 105 may also be operative with the service provider computer 104. The enrollment module 105 may include computer-executable instructions that are executed by the service provider computer 104 to facilitate healthcare provider enrollment with one or more payers, as described herein. The enrollment module 105 may be implemented as computer-implemented instructions of the memory 128 of the service provider computer 104. Alternatively, the enrollment module 105 may also be implemented as computer-implemented instructions of a memory of a separate processor-based system, according to an example embodiment of the invention. Enrollment or registration information used by the enrollment module 105 and/or service provider computer may be stored in or accessed from database 194.

The service provider computer 104 may operate with or execute the enrollment module 105 to perform one or more of the following to facilitate healthcare provider enrollment with one or more payers:

receive or request identification of one or more services that a healthcare provider wishes to register for;
receive or request identification of one or more payers that the healthcare provider wishes to register for one or more services with;
determine or identify required enrollment information needed for a healthcare provider to enroll for one or more services of the plurality of payers;
identify or receive available enrollment information of a healthcare provider;

determine missing enrollment information needed to enroll the healthcare provider for one or more services of the plurality of payers;

prepare a request for missing enrollment information;

receive any missing enrollment information;

pre-populate one or more enrollment forms for each of the plurality of payers; and deliver or direct the delivery of the completed enrollment forms to the healthcare provider or one or more payers.

It will be appreciated that the service provider computer 104 and/or the enrollment module 105 may perform other blocks or steps described herein to facilitate healthcare provider enrollment with one or more payers. Likewise, the service provider computer 104 and/or the enrollment module 105 may perform alternate blocks or steps to facilitate healthcare provider enrollment with one or more payers.

One or more payer computers 106 may be associated with a payer such as an insurance company, a pharmacy benefits manager (PBM), a government payer, a healthcare plan, a discount plan, or the like, according to an example embodiment of the invention. A payer computer 106 may be any processor-driven device, such as, but not limited to, a server computer, a mainframe computer, one or more networked computers, a desktop computer, a personal computer, a laptop computer, a mobile computer, a handheld portable computer, a digital assistant, a personal digital assistant, a digital tablet, an Internet appliance, or any other processor-based device. The payer computer 106 may include processor(s) 158, a memory 160, input/output ("I/O") interface(s) 162, and network interface(s) 164. The memory 160 may be any computer-readable medium, coupled to the processor 158, such as RAM, ROM, and/or a removable storage device for storing data files 166 and a database management system ("DBMS") to facilitate management of data files 166 and other data stored in the memory 160 and/or stored in separate databases. The memory 160 may store data files 166 and various program modules, such as an operating system ("OS") 168, a database management system ("DBMS"), and a host module 172. The OS 168 may be, but is not limited to, Microsoft Windows®, Apple OSX™, Linux, Unix, or a mainframe operating system. The host module 172 may receive, process, and respond to requests from the client module 152 of the healthcare provider computer 102, and may further receive, process, and respond to requests from the host module 140 of the service provider computer 104. According to an example embodiment of the invention, the payer computer 106 may be associated with coverage or benefits determination by an insurance company, a pharmacy benefits manger (PBM), a discount program, a government payer, or another third-party payer. According to an alternative example embodiment of the invention, a payer computer 106 may also be implemented as part of a service provider computer 104 or may otherwise be affiliated with the service provider computer 104.

The network 110 may include any telecommunication and/or data network, whether public, private, or a combination thereof, including a local area network, a wide area network, an intranet, an internet, the Internet, intermediate handheld data transfer devices, a publicly switched telephone network (PSTN), and/or any combination thereof and may be wired and/or wireless. The network 110 may also allow for real-time, off-line, and/or batch transactions to be transmitted between or among the healthcare provider computer 102, the service provider computer 104, and/or the payer computer 106. Due to network connectivity, various methodologies as described herein may be practiced in the context of distributed computing environments.

Those of ordinary skill in the art will appreciate that the system 100 shown in and described with respect to FIG. 1 is provided by way of example only. Numerous other operating environments, system architectures, and device configurations are possible. Accordingly, embodiments of the invention should not be construed as being limited to any particular operating environment, system architecture, or device configuration.

Operational Overview

Figure 2:
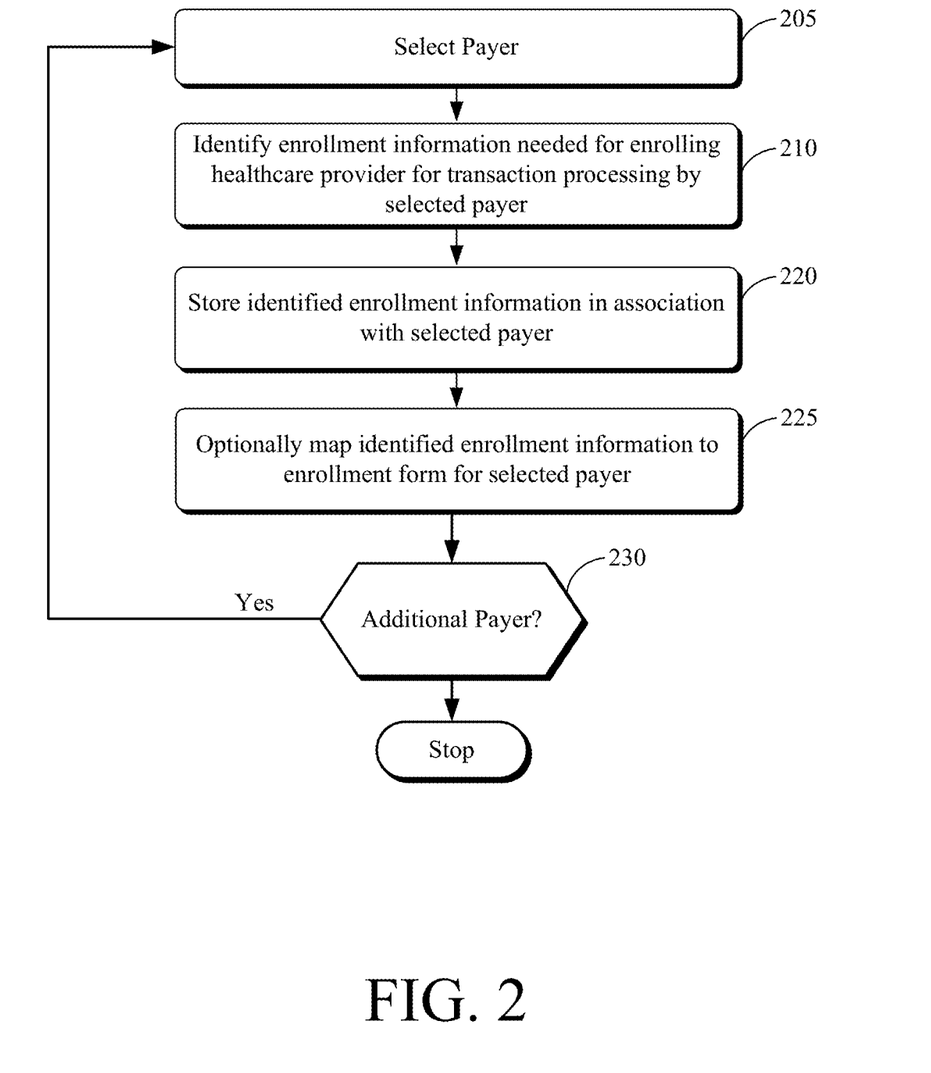
FIG. 2 illustrates an example flow diagram of a process for determining or identifying enrollment information associated with a plurality of payers, according to an example embodiment of the invention.

FIG. 2 illustrates an example flow diagram 200 of a process for determining or identifying enrollment information associated with a plurality of payers, according to an example embodiment of the invention. One or more blocks of the flow diagram 200 may be performed by the service provider computer 104 and/or the enrollment module 105 in accordance with example embodiments of the invention.

Turning now to FIG. 2, block 205 may include selecting a payer for which enrollment information needs to be determined or identified. Following block 205 is block 210. Block 210 can identify enrollment information needed or required for enrolling a healthcare provider for transaction processing or other services of the selected payer. In an example embodiment of the invention, block 210 can include performing optical character recognition or other scraping of an enrollment form of a respective payer to identify respective required enrollment information. Block 210 can also include an operator identifying required enrollment information from an enrollment form or other enrollment specifications of a respective payer. Alternatively, block 210 can include the service provider computer 104 and/or the enrollment module 105 requesting and receiving identification of the required enrollment information from a payer computer 106. It will be appreciated that the required enrollment information needed for enrolling a healthcare provider for transaction processing or other services may vary from payer to payer. However, some examples of required enrollment information of a selected payer may include one or more of the following:

Healthcare Provider Name

Healthcare Provider Identifier (e.g., National Provider Identifier (NPI) code)

Healthcare Provider Address (e.g., street, city, zip code, etc.)

Healthcare Provider Telephone Number

Healthcare Provider Email Address

Healthcare Provider Preferences for Services with Payer (e.g., Submit Claims, Receive Remittance Advices, Receive Reports, etc.)

Provider Account Info (e.g., ACH/EFT information, deposit account information, etc.)

Provider Group Details

Remittance preferences such as (e.g., all claims for a day in a single report, remittance advice split by national provider identifier (NPI), Amount, cut-off time for the day, etc)

Following block 210 is block 220. Block 220 may include storing an identification of the required enrollment information in association with the selected payer. For example, the identification of the required enrollment information can be stored in one or more records in database 194 in association with additional information identifying the selected payer (e.g., payer name, payer ID, etc.). The identification of the required enrollment information may be stored in a common, predefined, or standardized format associated with a plurality of payers. The use of a common, predefined, or standardized format may enable a determination of what enrollment information is available or missing when facilitating healthcare provider enrollment for a plurality of payers. It will be appreciated that storage of the enrollment information in association with a particular payer may facilitate the subsequent identification or determination of required enrollment information based upon an identification of the particular payer.

Following block 220 is block 225, which may be optional in accordance with an example embodiment of the invention. Block 225 may include mapping the identified enrollment information to a respective enrollment form for a selected payer. For example, the identified enrollment information may be mapped to one or more fields on a template enrollment form (e.g., a PDF form, MS Word form, HTML form, etc.) to facilitate the auto-population of the form based upon the received or retrieved enrollment information. Thus, this mapping information between the enrollment information and one or more fields on a template form can facilitate the automated completion or population of an enrollment form of a payer on behalf of a healthcare provider. For example, when the enrollment information is received or retrieved for a healthcare provider, it can be automatically used to fill in certain fields of a template enrollment form in accordance with the available mapping information.

Following block 225 is block 230. Block 230 may determine whether any additional payers remain for which enrollment information needs to be determined or identified. If so, then processing may return to block 205, where another payer may be selected. Otherwise, if no payers remain, then processing for FIG. 2 may terminate.

It will be appreciated that many variations of FIG. 2 are available without departing from example embodiments of the invention. For example, one or more blocks of FIG. 2 can be performed in a different order than that shown in FIG. 2. Alternatively, one or more blocks of FIG. 2 can be combined with other blocks or otherwise separated into two or more blocks.

Figure 3:
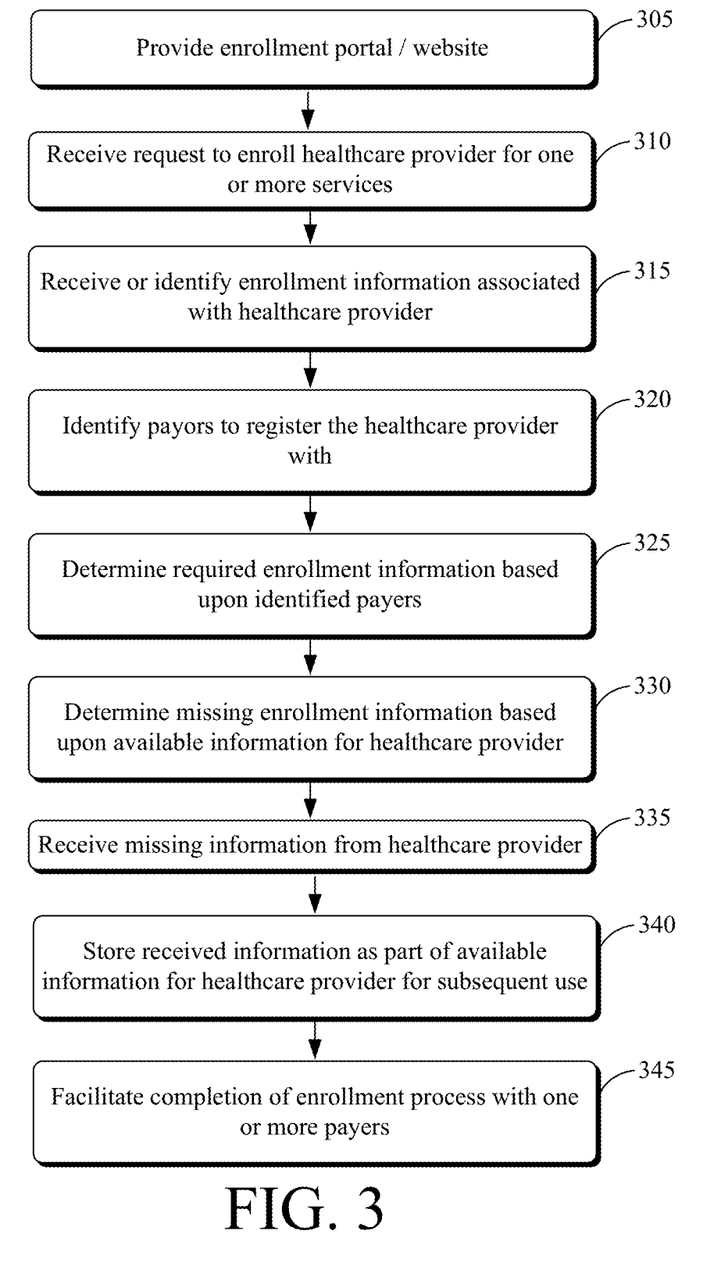
FIG. 3 illustrates an example flow diagram of a process for facilitating healthcare provider enrollment with one or more payers, according to an example embodiment of the invention.

FIG. 3 illustrates an example flow diagram 300 of a process for facilitating healthcare provider enrollment with one or more payers, according to an example embodiment of the invention. One or more blocks of the flow diagram 300 may be performed by the service provider computer 104 and/or the enrollment module 105 in accordance with example embodiments of the invention.

Turning now to FIG. 3, at block 305, a healthcare provider (e.g., office administrator, physician, pharmacist, etc.) may utilize healthcare provider computer 102 (or another computer such as a personal computer) to access one or more Internet portals/websites that facilitate healthcare provider enrollment with one or more services of one or more payers. The one or more Internet portals/websites can be operated by a web server included with, supported by, provided by, or otherwise affiliated with the service provider computer 104 and/or the enrollment module 105.

Figure 4:
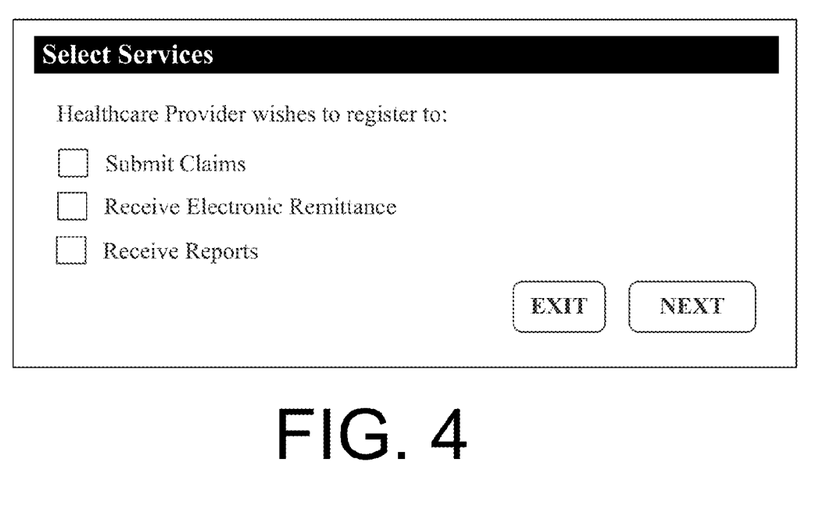
FIG. 4 illustrates an example user interface for presenting one or more services for selection by a healthcare provider, according to an example embodiment of the invention.

Following block 305 is block 310. Block 310 may include the service provider computer 104 and/or enrollment module 105 receiving a request to enroll a healthcare provider for one or more services. For example, at the one or more Internet portals/websites, the healthcare provider can make one or more selections or provide one or more indications corresponding to a request to enroll the healthcare provider with one or more services. FIG. 4 illustrates an example user interface for presenting one or more services for selection by a healthcare provider, according to an example embodiment of the invention. In FIG. 4, the user interface prompts the healthcare provider to select one or more of the following example services: submit claims, receive electronic remittance, or receive reports. Indeed, it will be appreciated that the example services may include transaction processing, including electronic claims submissions (e.g., ANSI ASC X12 837 medical claims, National Council for Prescription Drug Programs (NCPDP) prescription claims, etc.) to a payer for adjudication and benefits processing. Other example services may include receiving remittance advices (e.g., ANSI ASC X12 835 payment/advice), transaction responses (e.g., claim responses), or reports, according to an example embodiment of the invention. Many other example services are available without departing from example embodiments of the invention.

Figure 5:
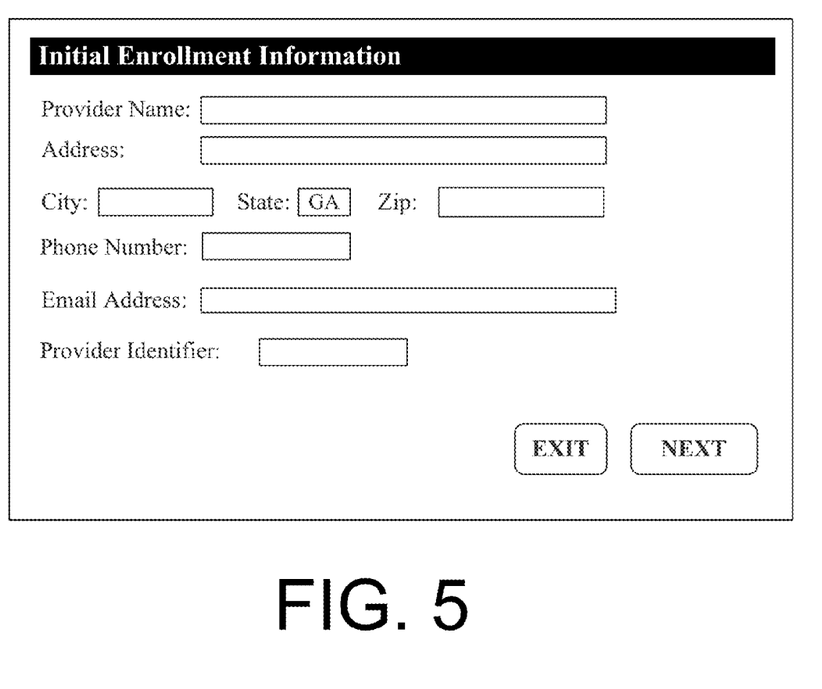
FIG. 5 illustrates an example user interface for requesting and receiving initial enrollment information, according to an example embodiment of the invention.

Once a request to enroll a healthcare provider for one or more services is received by the service provider computer 104 and/or enrollment module 105 at block 310, processing may proceed to block 315. Block 315 may include receiving or identifying enrollment information associated with the healthcare provider. The enrollment information can be captured by a service provider when a healthcare provider registers with or creates an account with a service provider, for example, at one or more Internet portals/websites. For example, at the one or more Internet portals/websites, the service provider computer 104 can receive enrollment information from a healthcare provider computer 102. FIG. 5 illustrates an example user interface for requesting and receiving initial enrollment information from a healthcare provider computer 102 via the Internet portal/website. As shown in FIG. 5, the example enrollment information can include a healthcare provider name, location information (e.g., address, city, state, zip code, etc.), a telephone number, an email address, a provider identifier (e.g., National Provider Identifier (NPI) code, Drug Enforcement Agency (DEA) number, etc.). In an alternative embodiment, previously received enrollment information, if available, may be retrieved from data storage such as database 194. For example, the previous enrollment information may have been previously captured from the healthcare provider during a prior enrollment for one or more services of one or more other payers. The prior enrollment information may have been stored in association with information identifying the healthcare provider to facilitate its subsequent retrieval when a healthcare provider wishes to enroll with one or more services of additional or alternative payers. It will be appreciated that additional or alternative enrollment information beyond those described herein may be available without departing from example embodiments of the invention.

Figure 6:
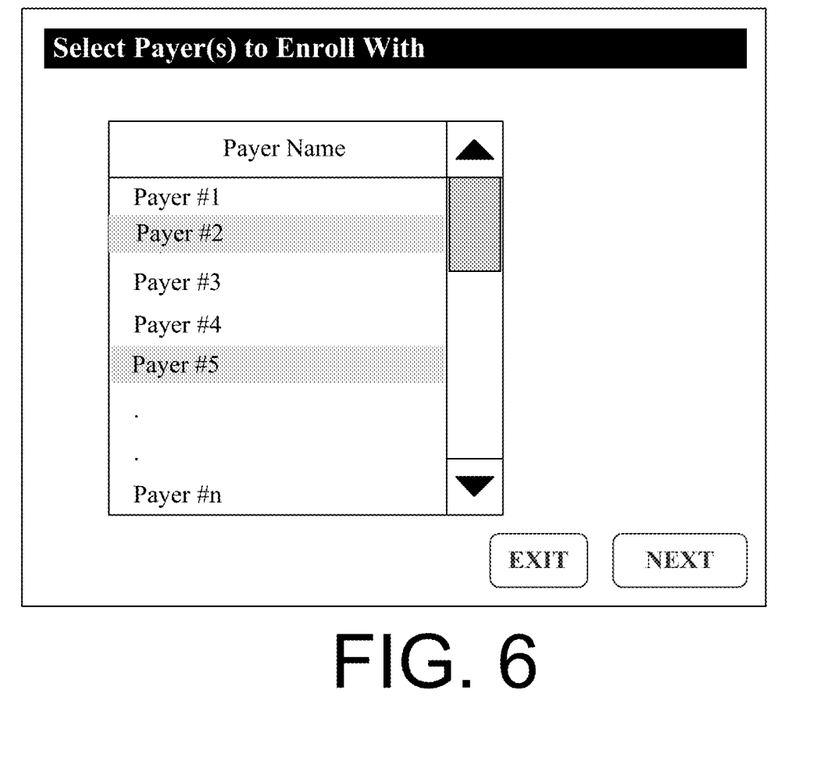
FIG. 6 illustrates an example user interface for requesting and receiving a selection of one or more payers, according to an example embodiment of the invention.

Following block 315 is block 320. Block 320 may include identifying payers that the healthcare provider wishes to register with for one or more services. FIG. 6 illustrates an example user interface for requesting and receiving a selection of one or more payers. The example user interface of FIG. 6 can be presented via one or more Internet portals/websites to the healthcare provider computer 102. In an example embodiment of the invention, the payers available for selection in FIG. 6 may be limited to payers that are registered with or supported by the service provider computer 104. It will be appreciated that in alternate embodiments of the invention, the healthcare provider computer 102 can also directly specify the name or identifiers of payers that the healthcare provider wishes to register with. Accordingly, upon completion of block 320, the service provider computer 104 and/or enrollment module 105 may receive identification of one or more payers that the healthcare provider wishes to register with.

Following block 320 is block 325. Block 325 may determine the required enrollment information based upon the identified or selected payers from block 320. To do so, the service provider computer 104 and/or the enrollment module 105 can retrieve the required enrollment information, perhaps from data storage such as database 194, based upon the identities of the selected payers. For example, as previously described in block 220 of FIG. 2, the respective required enrollment information may have been stored in association with information identifying each payer. Accordingly, the corresponding required enrollment information for each of the selected payers can be obtained, perhaps from data storage such as database 194. Because much of the required enrollment information may be common across multiple payers, block 325 may determine the required enrollment information that is shared by all of the selected payers, as well as other enrollment information that may be particular to only a subset of the selected payers.

Following block 325 is block 330. Block 330 may include determining missing enrollment information based upon the available information for the healthcare provider. For example, block 330 may include comparing the required enrollment information to the available information for the healthcare provider to determine the missing enrollment information. Recall that the required enrollment information may be available from block 325, and the available enrollment information may be available from block 315. Accordingly, by knowing what the required enrollment information is as well as what enrollment information is available, block 330 can determine what missing enrollment information is needed in order to obtain all of the required enrollment information. For one or more items of missing enrollment information, block 330 can also determine one or more payers that are requesting the items of missing enrollment information.

Figure 7:
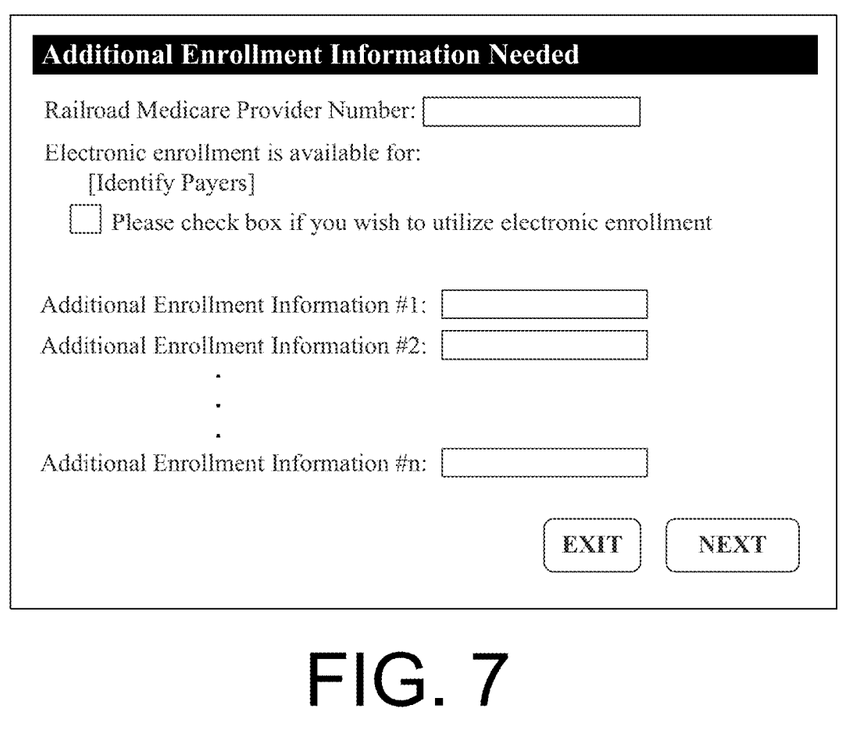
FIG. 7 illustrates an example user interface for requesting and receiving additional or missing information from the healthcare provider, according to an example embodiment of the invention.

Following block 330 is block 335. Block 335 may include the service provider computer 104 and/or enrollment module 105 receiving missing information from the healthcare provider. FIG. 7 illustrates an example user interface for requesting and receiving additional or missing information from the healthcare provider. In FIG. 7, the missing additional healthcare provider identifiers (e.g., railroad medicare provider number, etc.), enrollment preferences (e.g., electronic enrollment, manual enrollment, etc.), or yet other additional enrollment information. In some example embodiments of the invention, the missing information can be presented or requested on a payer-by-payer basis so that the healthcare provider can determine which payer is requesting which information. In another example embodiment, the missing information for a plurality of payers can be aggregated and presented to the healthcare provider in a combined webpage (s), session, etc. At block 335, the healthcare provider computer 102 can provide or deliver the missing enrollment information to the service provider computer 104 and/or enrollment module 105. If the healthcare provider computer 102 and/or enrollment module 105 determines that any of the received enrollment information is incomplete or not valid, then the healthcare provider computer 102 may be informed and have an opportunity to resubmit one or more items of missing enrollment information.

Block 340 may include storing, for subsequent retrieval or use, the received missing enrollment information as part of available information for the healthcare provider. For example, the missing enrollment information that is received can be stored in data storage such as database 194 in conjunction with other available enrollment information for the healthcare provider. Accordingly, as the healthcare provider provides additional enrollment information, the amount of available enrollment information for the healthcare provider can increase, thereby reducing the likelihood that additional enrollment information will be needed for future enrollments of the healthcare providers with one or more other payers.

Figure 8:
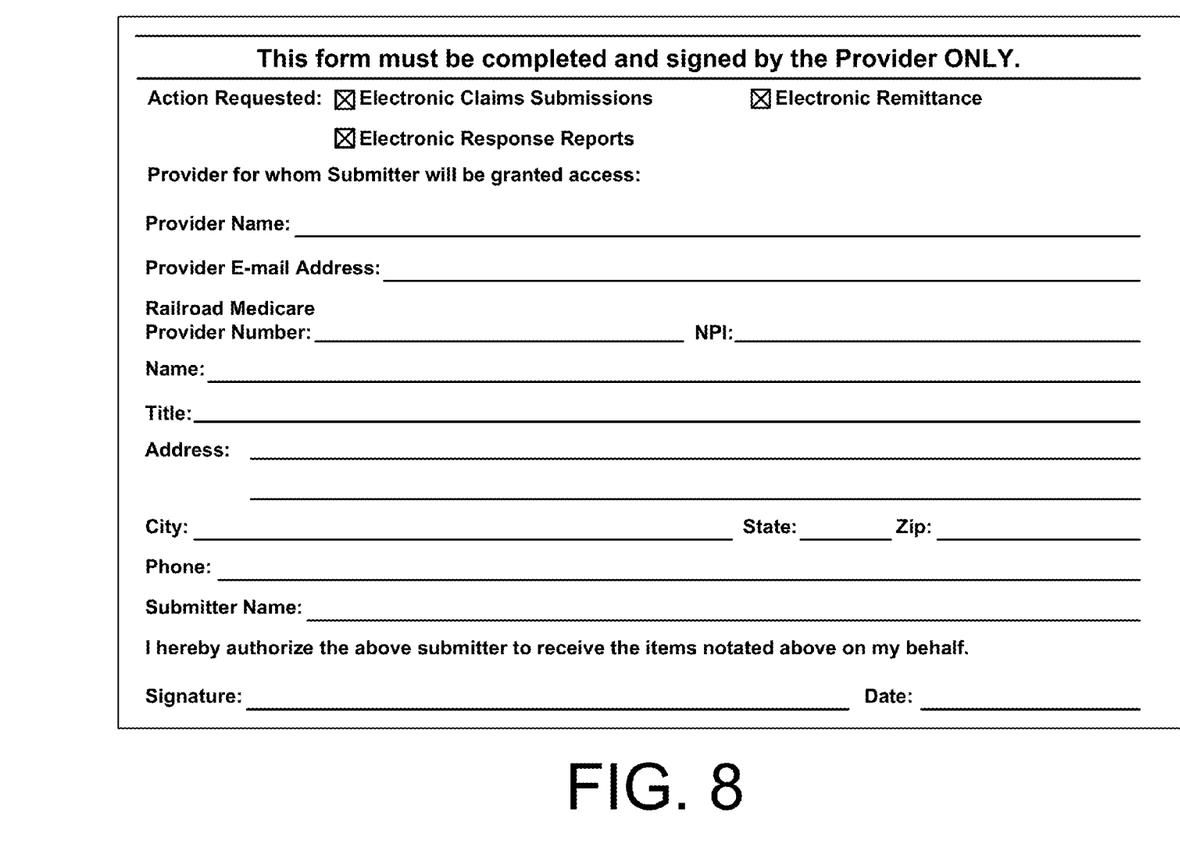
FIG. 8 illustrates an example enrollment form that may be populated with the example enrollment information, according to an example embodiment of the invention.

Block 345 may include facilitating completion of the healthcare provider enrollment process with one or more payers. It will be appreciated that the service provider computer 104 and/or enrollment module 105 can facilitate the enrollment process in a variety of ways. In an embodiment, the enrollment process can be facilitated by automatically populating one or more respective enrollment forms for each selected payer using the available enrollment information (e.g., from blocks 315 and/or 335). FIG. 8 illustrates an example enrollment form that may be populated with the example enrollment information, according to an example embodiment of the invention. If needed, the mapping of enrollment information to one or more fields of an enrollment form for a payer may be available from data storage such as database 194, as previously described with respect to block 225 of FIG. 2. Once the respective enrollment forms have been completed for the selected payers, the service provider computer 104 and/or enrollment module 105 can facilitate the enrollment process by delivering or directing the delivery of the completed enrollment forms to the healthcare provider. For example, completed enrollment forms can be faxed, emailed, or presented on an Internet portal/website (e.g., as a completed PDF or HTML enrollment form, etc.) for downloading or printing, or otherwise electronically delivered to the healthcare provider and/or healthcare provider computer 102. Alternatively, the completed healthcare forms can also be mailed or physically delivered from the service provider to the healthcare provider. Upon receipt of the completed healthcare forms, the healthcare provider can then execute the forms if necessary and then return the forms to the service provider or the respective payers. In another example embodiment, the service provider computer 104 and/or enrollment module 105 can facilitate the automatic delivery of the completed healthcare forms to the payer. For example, the service provider computer 104 and/or enrollment module 105 can deliver or direct the delivery of the respective completed healthcare forms in an electronic format (e.g., PDF, HTML, MS Word, CSV file, etc.) to the respective payer, or a respective data storage location of the respective payer. Indeed, the service provider computer 104 and/or enrollment module 105 can deliver or direct the delivery of the respective completed healthcare forms to the respective payer via fax, email, Internet portal/website presentation (e.g., as a completed PDF or HTML enrollment form, etc.), or other electronic delivery means. Alternatively, the respective completed healthcare forms can also be mailed or physically delivered from the service provider to the respective payer. It will be appreciated that there may be many variations of facilitating completion of the healthcare provider enrollment process with one or more payers without departing from example embodiments of the invention.

It will be appreciated that many variations of FIG. 3 are available without departing from example embodiments of the invention. For example, one or more blocks of FIG. 3 can be performed in a different order than that shown in FIG. 3. Alternatively, one or more blocks of FIG. 3 can be combined with other blocks or otherwise separated into two or more blocks.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

It will be appreciated that each of the memories and data storage devices described herein can store data and information for subsequent retrieval. The memories and databases can be in communication with each other and/or other databases, such as a centralized database, or other types of data storage devices. When needed, data or information stored in a memory or database may be transmitted to a centralized database capable of receiving data, information, or data records from more than one database or other data storage devices. In other embodiments, the databases shown can be integrated or distributed into any number of databases or other data storage devices.

It will also be appreciated that each of the I/O interfaces described herein may facilitate communication between a processor and various I/O devices, such as a keyboard, mouse, printer, microphone, speaker, monitor, bar code readers/scanners, RFID readers, and the like. Likewise, each of the network interfaces described herein may take any of a number of forms, such as a network interface card, a modem, a wireless network card, and the like.

It will further be appreciated that while certain computers have been illustrated herein as a single computer or processor, the illustrated computers may actually be comprised of a group of computers or processors, according to an example embodiment of the invention.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method, comprising:
   receiving, by at least one service provider computer associated with a service provider, from a healthcare provider computer associated with a healthcare provider, identification of a plurality of payers;
   determining, by at least one of the service provider or the service provider computer, required enrollment information needed for the healthcare provider to register for using one or more services provided by one or more of the plurality of payers;
   retrieving or receiving, by at least one of the service provider or the service provider computer, available enrollment information associated with the healthcare provider;
   determining, by at least one of the service provider or the service provider computer, missing enrollment information based upon a comparison of the required enrollment information and the available enrollment information; and
   transmitting, by the service provider computer, to the healthcare provider computer, a request for the missing enrollment information;
   providing by the service provider computer, a user interface that allows the health care provider to select the one or more services provided by the one or more of the plurality of payers, wherein the one or more services comprises at least one of a claims service, an electronic remittance service, or a reports service.

2. The method of claim 1, further comprising:
   receiving, by the service provider computer, from the healthcare provider computer, the missing enrollment information.

3. The method of claim 1, further comprising:
   pre-populating respective enrollment forms for each of the plurality of payers.

4. The method of claim 3, further comprising:
   delivering the respective enrollment forms to each of the plurality of payers.

5. The method of claim 3, further comprising:
   delivering the respective enrollment forms to the healthcare provider computer.

6. The method of claim 3, wherein the enrollment of the healthcare provider enables the service provider to facilitate one or more healthcare transactions between the healthcare provider computer and respective payer computers associated with each of the plurality of payers.

7. The method of claim 1, wherein the available enrollment information is received during an initial registration session prior to receiving the identification of the plurality of payers.

8. The method of claim 1, wherein the required enrollment information is determined based upon a prior analysis of required information from respective enrollment forms of each of the plurality of payers.

9. The method of claim 1, wherein the plurality of payers comprises at least one of a pharmacy benefits manager (PBM), a government payer, a health care plan, or a discount plan.

10. The method of claim 1, further comprising:
providing by the service provider computer, a user interface that allows the health care provider to select one or more of payers from a listing of payers for transmitting the identification of the plurality of payers to the healthcare provider computer.

11. A system, comprising:
at least one memory for storing computer-executable instructions; and
at least one processor in communication with the at least one memory, wherein the at least one processor is configured to execute the computer-executable instructions to:
receive, from a healthcare provider computer associated with a healthcare provider, identification of a plurality of payers;
determine required enrollment information needed for the healthcare provider to register to use one or more services provided by one or more of the plurality of payers;
retrieve or receive available enrollment information associated with the healthcare provider;
determine missing enrollment information based upon a comparison of the required enrollment information and the available enrollment information; and
transmit to the healthcare provider computer, a request for the missing enrollment information;
provide a user interface that allows the health care provider to select the one or more services provided by the one or more of the plurality of payers, wherein the one or more services comprises at least one of a claims service, an electronic remittance service, or a reports service.

12. The system of claim 11, wherein the at least one processor is further configured to execute the computer-executable instructions to:
receive, from the healthcare provider computer, the missing enrollment information.

13. The system of claim 11, wherein the at least one processor is further configured to execute the computer-executable instructions to:
facilitate enrollment of the health care provider by pre-populating respective enrollment forms for each of the plurality of payers.

14. The system of claim 13, wherein the enrollment is further facilitated by automatically delivering the respective enrollment forms to each of the plurality of payers.

15. The system of claim 13, wherein the enrollment is facilitated by delivering the respective enrollment forms to the healthcare provider computer.

16. The system of claim 11, wherein the enrollment of the healthcare provider for one or more services of the plurality of payers enables the service provider to facilitate one or more healthcare transactions between the healthcare provider computer and respective payer computers associated with each of the plurality of payers.

17. The system of claim 16, wherein the one or more healthcare transactions include one or more types of healthcare claim transactions.

18. The system of claim 11, wherein the available enrollment information is received during an initial registration session prior to receiving the identification of the plurality of payers.

* * * * *